(12) United States Patent
Ho et al.

(10) Patent No.: US 7,441,128 B2
(45) Date of Patent: Oct. 21, 2008

(54) POWER-STATE MANAGEMENT OF PERIPHERAL DEVICE BY NORTH BRIDGE FOR POWER MANAGEMENT OF COMPUTER SYSTEM

(75) Inventors: Tony Ho, Taipei (TW); Wayne Tseng, Taipei (TW)

(73) Assignee: Via Technologies, Inc., Taipei (TW)

( * ) Notice: Subject to any disclaimer, the term of this patent is extended or adjusted under 35 U.S.C. 154(b) by 503 days.

(21) Appl. No.: 11/197,571

(22) Filed: Aug. 4, 2005

(65) Prior Publication Data
US 2006/0047984 A1    Mar. 2, 2006

(30) Foreign Application Priority Data
Aug. 26, 2004    (TW) ............................. 93125620 A

(51) Int. Cl.
*G06F 1/26*    (2006.01)

(52) U.S. Cl. ........................ 713/300; 713/320; 713/323

(58) Field of Classification Search ................. 713/300, 713/320, 323
See application file for complete search history.

(56) References Cited

U.S. PATENT DOCUMENTS

| 5,892,958 | A  | * | 4/1999 | Nagashige et al. | ........... 713/323 |
| 6,199,134 | B1 | * | 3/2001 | Deschepper et al. | ........ 710/311 |
| 6,360,327 | B1 | * | 3/2002 | Hobson | ...................... 713/300 |
| 6,732,280 | B1 | * | 5/2004 | Cheok et al. | ................. 713/300 |
| 2005/0039063 | A1 | | 2/2005 | Hsu et al. | |

* cited by examiner

*Primary Examiner*—Nitin C Patel
(74) *Attorney, Agent, or Firm*—Kirton & McConkie; Evan R. Witt

(57) ABSTRACT

In a power management method of a computer system, the CPU asserts a clock-suspending grant cycle in response to a clock-suspending signal issued by the south bridge chip, and the south bridge chip issues the clock-suspending signal in response to a data write cycle asserted by the CPU. The clock-suspending grant cycle is to be transmitted to the south bridge chip via the north bridge chip when the CPU is ready to enter a power-saving mode. The north bridge chip performs a first power management operation of the peripheral device in response to the clock-suspending grant cycle. The south bridge chip performs a second power management operation of the computer system in response to the clock-suspending grant cycle.

20 Claims, 4 Drawing Sheets

POWER-STATE MANAGEMENT OF PERIPHERAL DEVICE BY NORTH BRIDGE FOR POWER MANAGEMENT OF COMPUTER SYSTEM

FIELD OF THE INVENTION

The present invention relates to a power management method, and more particularly to a power management method of a computer system.

BACKGROUND OF THE INVENTION

Please refer to FIG. 1 that is a functional block diagram showing a computer system operated with Peripheral Component Interconnect (PCI) Express Protocol. In FIG. 1, CPU 10, north bridge chip 11, south bridge chip 12, power 13 and PCI Express devices 140, 141, 142, 143 and 144 are illustrated. The north bridge chip 11 serves as a root complex of the whole PCI Express system, and there is Express Link existing between each PCI Express device and the root complex.

For implementing power management of the above computer system, the computer operating system utilizes a write cycle to write data into a power management I/O port in the south bridge chip 12, thereby entering one of different power-saving states S1, S3, S4 and S5. The state S1 indicates a standby mode. The state S3 indicates a STR mode, which is usually entered to shut down the power supplied to the CPU 10 and other devices such as a hard disc drive after the computer system has stored specific data to the random access memory (RAM). Nevertheless, the power supplied to a RAM is reserved to prevent from data loss and quickly restore the system by re-loading the specific data from the RAM. The state S4 indicates a STD mode wherein the computer system has stored specific data to a non-volatile memory such as a disk partition. The state S5 indicates a software-shutoff mode. In response to the write cycle, a power management unit 120 in the south bridge chip 12 asserts a clock-suspending signal STPCLK to the CPU 10. In response to the clock-suspending signal STPCLK, the CPU 10 is ready to enter a power-saving mode. Meanwhile, the CPU 10 asserts a clock-suspending grant cycle STPGNT to the south bridge chip 12 via the north bridge chip 11. In response to the clock-suspending grant cycle STPGNT, a SUSB signal indicative of the S3 state or a combination of SUSB and SUSC signals indicative of the S4 or S5 mode will be issued by the south bridge chip 12 to result in different kinds of power management. The system including the CPU 10 then enters the power-saving mode.

As mentioned above, in the PCI Express Protocol, there are a plurality of PCI Express devices connected to the north bridge chip 11. When the CPU 10 asserts a clock-suspending grant cycle STPGNT to the south bridge chip 12, the south bridge chip 12 will issue a SUSB signal or a combination of SUSB and SUSC signals to have the system enter the power-saving mode S3, S4 or S5. Accordingly, the power supplied to the PCI Express devices will be removed. Since such removal of power is unpredictable for both the PCI Express devices and the root complex, it may result in failure in subsequent re-initialization of these devices.

SUMMARY OF THE INVENTION

Therefore, the present invention provides a power management method to take care of not only the power states of the system but also the power states of the PCI Express devices.

The present invention provides a power management method of a computer system. The computer system comprises a central processing unit (CPU), a host bridge, a secondary bridge and a peripheral device coupled to the host bridge. In the method, the CPU asserts a clock-suspending grant cycle to be transmitted to the secondary bridge via the host bridge when the CPU is in a ready state for a power-saving mode. The host bridge performs a first power management operation of the peripheral device before the computer system enters said power-saving mode.

In an embodiment, in the first power management operation, a peripheral power-switching signal is issued to the peripheral device to switch a power state of the peripheral device while stopping the transmission of the clock-suspending grant cycle to the secondary bridge. The transmission of the clock-suspending grant cycle to the secondary bridge is restored to perform a second power management operation after the power state of the peripheral device has been switched completely.

In an embodiment, the power-switching complete signal is sent from the peripheral device back to the host bridge when the power state of the peripheral device has been switched completely. The power state of the peripheral device is switched from a fully active link state to a lower power sleep state or a zero power sleep state in response to the peripheral power-switching signal.

In an alternative embodiment, in the first power management operation, a peripheral power-switching signal is issued to the peripheral device to switch a power state of the peripheral device while stopping the transmission of the clock-suspending grant cycle to the secondary bridge. The transmission of the clock-suspending grant cycle to the secondary bridge is restored to perform a second power management operation when a predetermined time period has been due since the peripheral power-switching signal is issued.

In an embodiment, the second power management operation enables the computer system to enter the power-saving mode.

For example, the power-saving mode is selected from a group consisting of a standby mode, a STR mode, a software-shutoff mode and a mechanically shutoff mode.

In an embodiment, the CPU asserts the clock-suspending grant cycle in response to a clock-suspending signal issued by the secondary bridge, and the secondary bridge issues the clock-suspending signal in response to a data write cycle asserted by the CPU.

For example, the peripheral device can be a Peripheral Component Interconnect (PCI) Express device.

In accordance with another aspect of the present power management method, the CPU asserts a data write cycle to the south bridge chip via the north bridge chip; the north bridge chip performs a first power management operation of the peripheral device when information of the data write cycle is consistent with a specific condition; and the south bridge chip performs a second power management operation of the computer system after the first power management operation of the peripheral device.

In an embodiment, the south bridge chip issues a clock-suspending signal in response to the data write cycle consistent with the specific condition, and the CPU asserts a clock-suspending grant cycle in response to the clock-suspending signal issued by the south bridge chip.

In an embodiment, whether the information of the data write cycle is consistent with the specific condition is performed by comparing the information of the data write cycle with data stored in registers of the north bridge chip: The information of the data write cycle to be compared includes the enable state of a sleep command, a sleep address, the type of a sleep command, a written data, a sleep mask, and an AND gate operation result of the written data and the sleep mask.

In accordance with a further aspect of the present invention, a power management method of a computer system comprises steps of: sending out a clock-suspending signal from a secondary bridge; sending out a clock-suspending grant cycle from a CPU in response to the clock-suspending signal when the CPU is in a ready state for a power-saving mode; performing a first power management operation by a host bridge; and transferring the clock-suspending grant cycle from the host bridge to the secondary bridge after the first power management operation is performed.

In an embodiment, the power management method further comprises a step of performing a second power management operation by the secondary bridge in response to the clock-suspending grant cycle.

In an embodiment, the first power management operation is performed for entering a peripheral device coupled to the host bridge into a power-saving mode, and the second power management operation is performed for entering the system into a power-saving mode.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
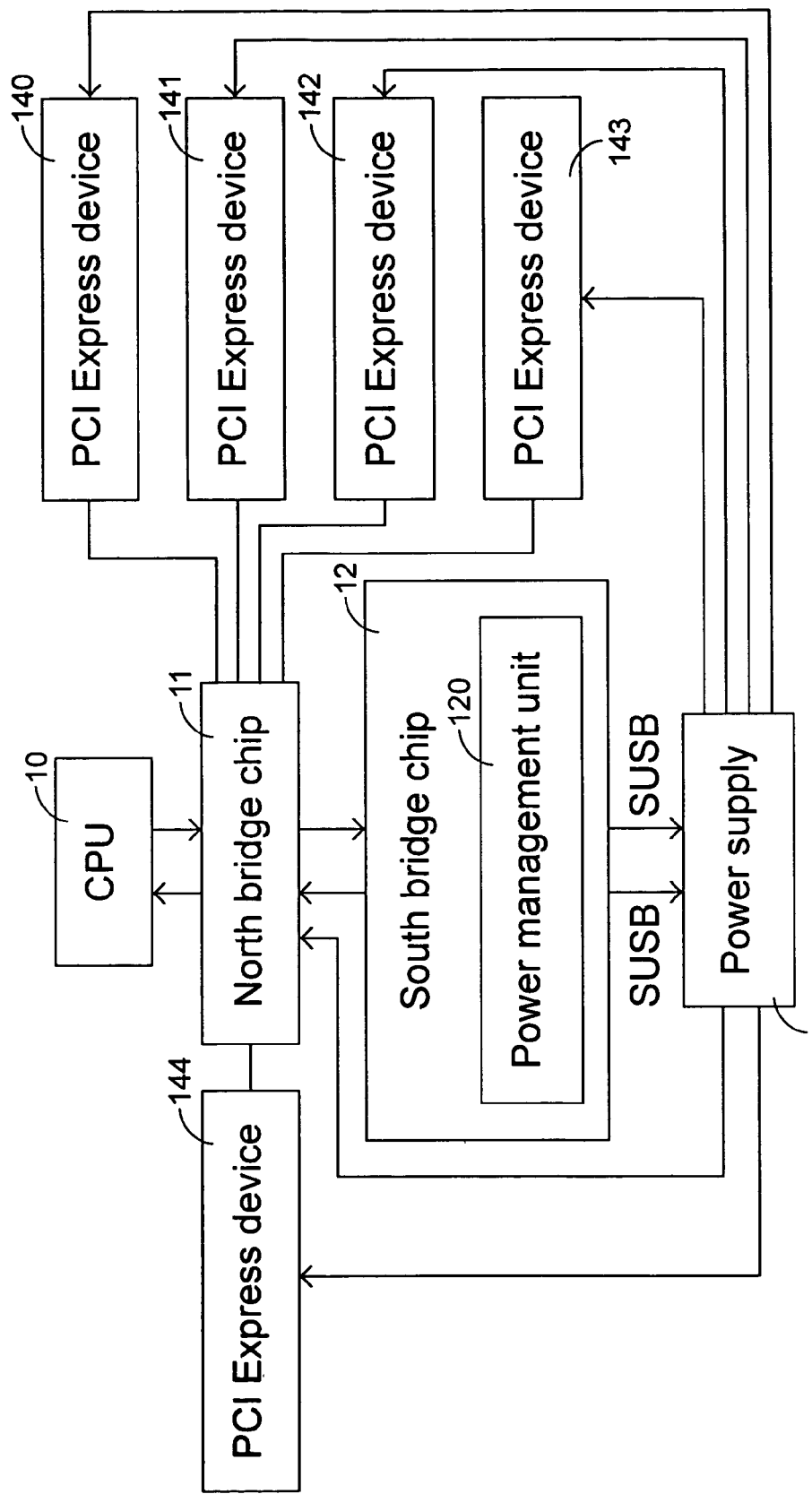
FIG. 1 is a functional block diagram showing a computer system operated with Peripheral Component Interconnect (PCI) Express Protocol.
Figure 2A:
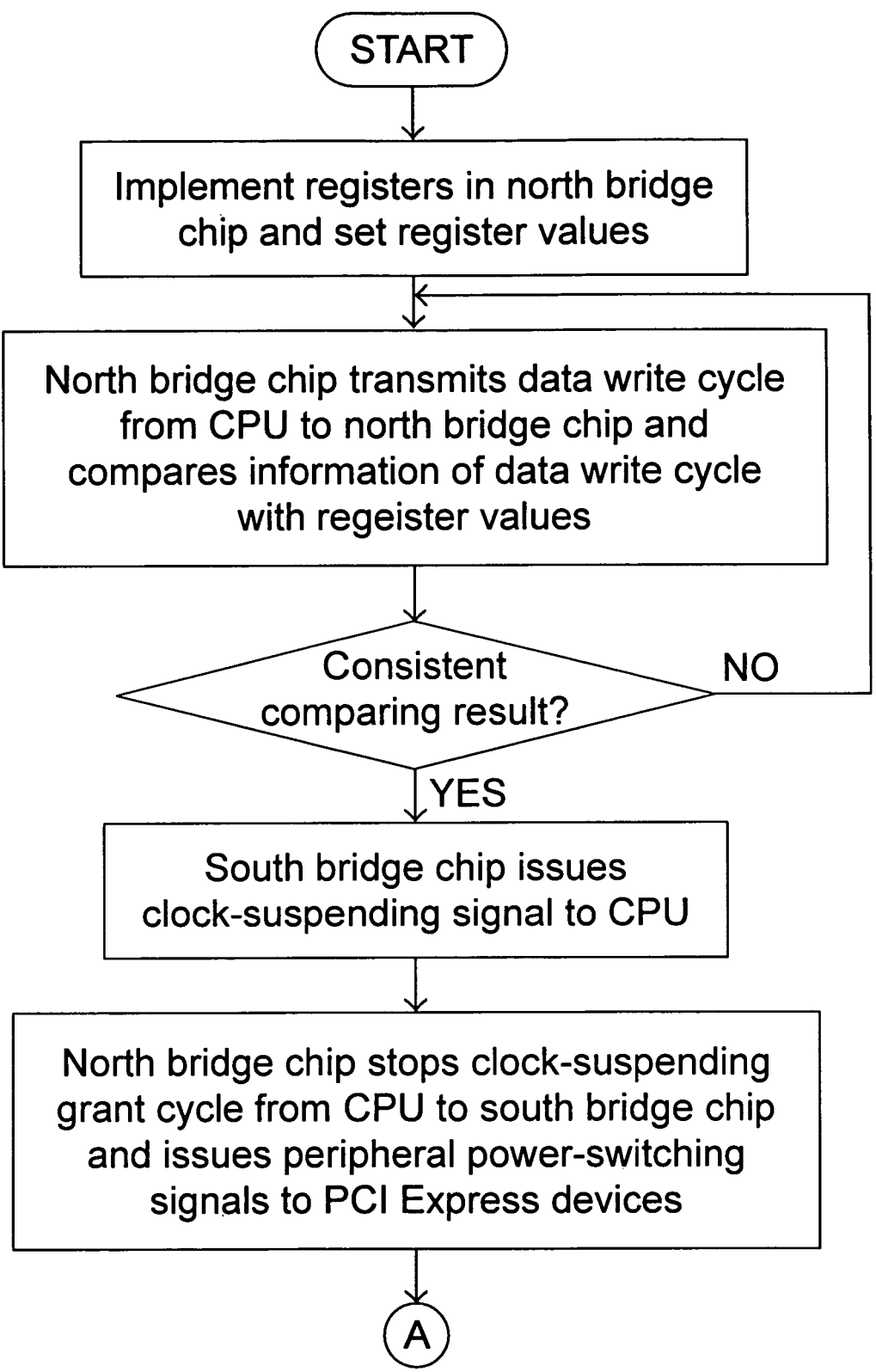
FIGS. 2A and 2B are flowcharts illustrating a power management method according to an embodiment of the present invention.
Figure 2B:
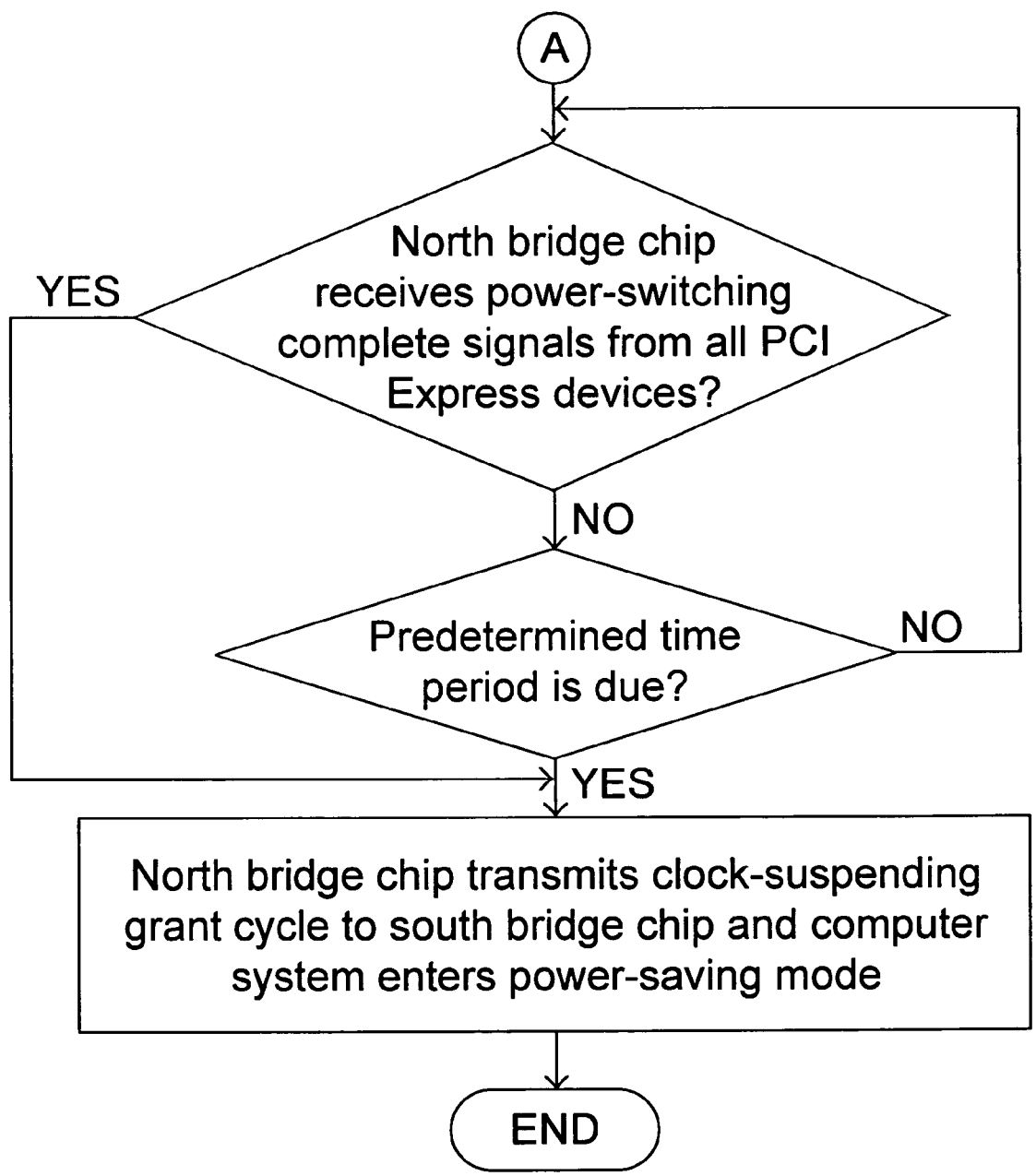

From the above description relevant to FIG. 1, it is understood that the CPU 10 and the south bridge chip 12 transmit cycles or signals via the north bridge chip 11 and the PCI Express devices are connected to the north bridge chip 11. Therefore, a power management method can be performed through the north bridge chip 11 to manage both the power states of the system and the power states of the PCI Express devices. That is, as soon as the north bridge chip 11 realizes that some power-saving mode is to be entered, the north bridge chip 11 will deal with the power states of the PCI Express devices before the power-saving mode of the system is entered. It is to be noted that the computer system of FIG. 1 is just an example which the present invention can be applied to. The present invention can also be applied to any other suitable system where a CPU and a secondary bridge transmit cycles or signals via a host bridge to perform similar management. The power management method according to an embodiment of the present invention will be described herein with reference to the flowchart of FIGS. 2A and 2B.

In this embodiment, a set of registers are provided in the north bridge chip, each of which stores therein preset data associated with the power-saving functions of the system. For example, the registers include a first register storing therein data for checking the enable state of a sleep command (CHK_Sleep_CMD_En register); a second register storing therein data for checking a sleep address (CHK_Sleep_Addr register); a third register storing therein data for checking the type of a sleep command (CHK_Sleep_CMD register); a fourth register for storing therein data for checking first sleep data (CHK_Sleep_Data1 register); a fifth register for storing therein data for checking first sleep mask register (CHK_Sleep_Mask1 register); a sixth register for storing therein data for checking second sleep data (CHK_Sleep_Data2 register); a seventh register for storing therein data for checking second sleep mask register (CHK_Sleep_Mask2 register); and an eighth register for storing data for reporting power management events (PME_TO_ACK_Status register). The north bridge chip 11 can determine whether there is a power-saving mode to be entered according to the write cycle transmitted from the CPU 10 to the south bridge chip 12 therethrough. If the information of the write cycle is consistent with the data stored in the registers, it means the system is entering a power-saving mode, and the power will be removed after the CPU 10 issues the clock-suspending grant cycle STPGNT and enters a ready state. Therefore, the north bridge chip 11 stops the transmission of the clock-suspending grant cycle STPGNT to the south bridge chip 12 until the power management of the PCI Express devices 140, 141, 142, 143 and 144 have been settled.

For readily understanding the invention, examples of the data stored in the registers are given as follows. The data for checking the enable state of a sleep command can be a bit "1" or "0" representing the "enabled" state. The data for checking a sleep address can be the address of the power management I/O port, e.g. 4004h. The data for checking the type of a sleep command can be bit or bits representing "power management I/O write cycle". The data for checking first sleep data can be a predetermined value, e.g. 28$h$. The data for checking first sleep mask can be another predetermined value, e.g. 03Fh. The data for checking second sleep data can be still another predetermined value, e.g. 24h. The data for checking second sleep mask can also be a predetermined value, e.g. 03Fh. When the north bridge chip 11 realizes that the data write cycle includes the information consistent with the above data stored in the registers in a specific manner, it can be inferred that the operating system is to enter the computer system into some power-saving mode. Therefore, the power management of the PCI Express devices should be performed in advance. For example, when the information of the data write cycle indicates an "enabled" state of a sleep command (consistent with the data in the first register), a sleep address of "4004h" (consistent with the data in the second register), a sleep command of "power management I/O write cycle" (consistent with the data in the third register), a data write cycle of "24h", a sleep mask of "03Fh" (consistent with the data in the seventh register), and an AND gate operation result of "24h" (consistent with the data in the sixth register) between the written data and the sleep mask, it means the sleep state S3 is going to be entered. On the other hand, when the information of the data write cycle indicates an "enabled" state of a sleep command (consistent with the data in the first register), a sleep address of "4004h" (consistent with the data in the second register), a sleep command of "power management I/O write cycle" (consistent with the data in the third register), a data write cycle of "28$h$", a sleep mask of "03Fh" (consistent with the data in the fifth register), and an AND gate operation result of "28h" (consistent with the data in the fourth register) between the written data and the sleep mask, it means the sleep state S4 or S5 is going to be entered.

Figure 3:
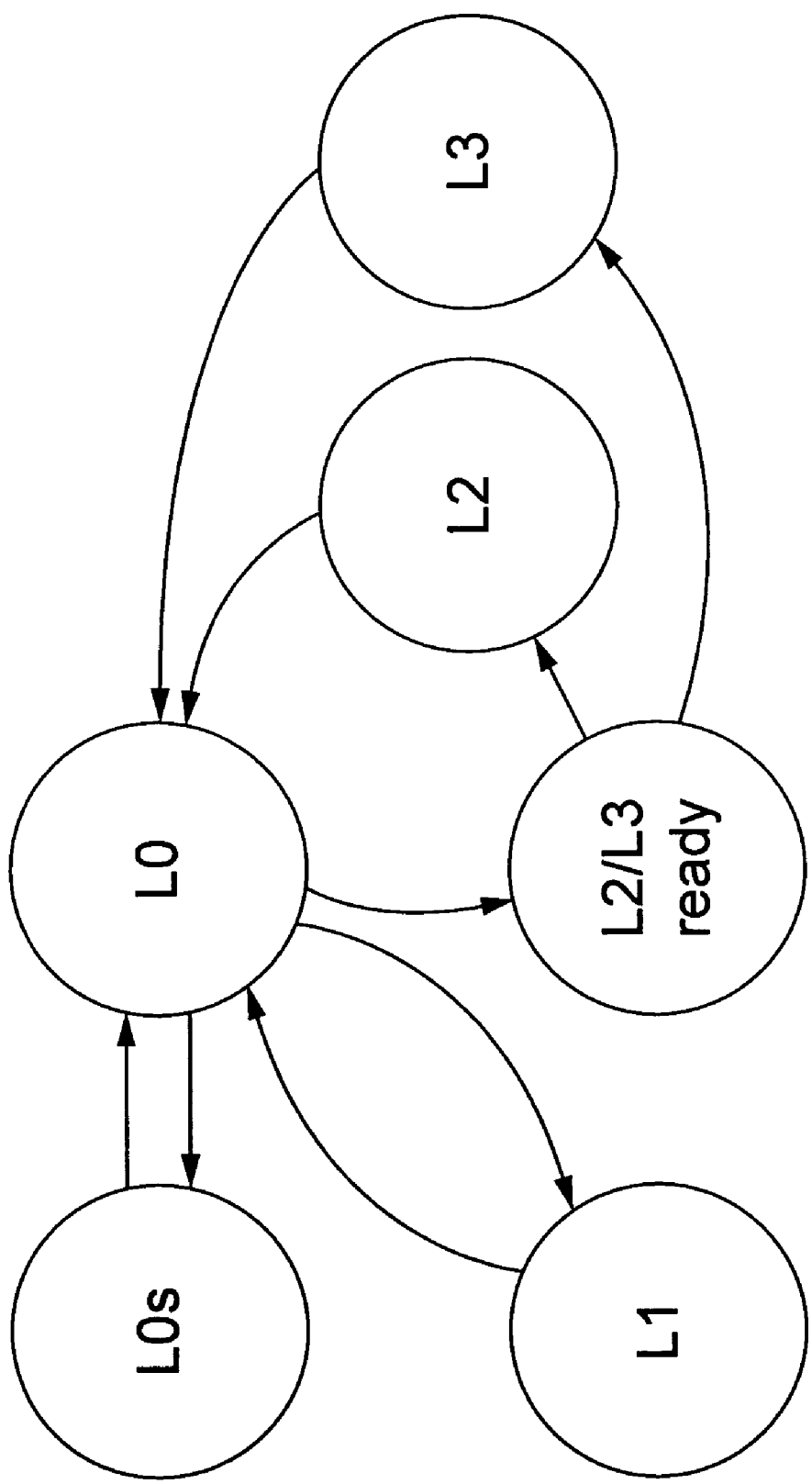
FIG. 3 is a schematic diagram showing the switching of the power management states of the PCI Express devices express-linked in the PCI Express Protocol.

The switching of the power management states of the PCI Express devices express-linked in the PCI Express Protocol is illustrated in FIG. 3. L0 indicates a fully active link state; L0s indicates a standby state; L1 indicates a lower power standby state; L2 indicates a lower power sleep state; and L3 indicates a zero power sleep state. Before switching from State L0 to State L2 or State L3, a transition state, i.e. L2/L3 ready state, is first entered to check whether the system is under an auxiliary power available state. If it is under an auxiliary power available state, e.g. equivalent to the state S1 or S3, the PCI Express device will be switched to the lower power sleep state L2. On the other hand, the PCI Express device will be switched to the zero power sleep state L3 if it is not under an auxiliary power available state. When the north bridge chip 11 realizes that the data write cycle includes the information consistent with the above data stored in the registers, the north bridge chip 11 stops the transmission of the clock-suspending grant cycle STPGNT to the south bridge chip 12. Meanwhile, the north bridge chip 11 issues a peripheral power-switching signal to each of the PCI Express devices 140, 141, 142, 143 and 144 to have them enter the L2 or L3 sleep state. After the north bridge chip 11 receives power-switching complete signals from all the PCI Express devices 140, 141, 142, 143 and 144 to confirm completion of power-switching, or after the peripheral power-switching signals have been issued for a predetermined time period, the data stored in the eighth register for reporting power management events will be switched into a switching complete state, e.g. bit "1", and the transmission of the clock-suspending grant cycle STPGNT to the south bridge chip 12 is restored. Otherwise, the data for reporting power management events will be remained as bit "0" that indicates a switching incomplete state, and the clock-suspending grant cycle STPGNT to the south bridge chip 12 is still stopped. Under this circumstance, the power to the PCI Express devices 140, 141, 142, 143 and 144 can be removed without adversely affecting subsequent re-initialization of these devices.

In another embodiment, the present invention can also be combined with System Management Interrupt (SMI) as follows. When the CPU 10 asserts a first data write cycle (written data 24h or 28h) to a first power management I/O port (40F0h) in the south bridge chip 12 via the north bridge chip 11, the south bridge chip 12 issues a SMI signal to the CPU 10 in response. In response to the SMI signal, the CPU 10 performs a SMI service. Accordingly, the south bridge chip 12 issues a clock-suspending signal STPCLK to the CPU 10. In response to the clock-suspending signal STPCLK, the CPU 10 asserts a second data write cycle (written data 24h or 28h) to a second power management I/O port (40FFh) in the south bridge chip 12 via the north bridge chip 11. The north bridge chip 11 then performs a power management operation of the PCI Express devices 140, 141, 142, 143 and 144 while transmitting the second data write cycle to the south bridge chip 12. The power management operation corresponds to the SMI service of the CPU 10. For example, the SMI service of the CPU 10 includes setting the data stored in the registers of the north bridge chip 11 as follows. The data for checking the enable state of a sleep command is bit or bits representing the "enabled" state. The data for checking a sleep address is the address of the power management I/O port "40FFh". The data for checking the type of a sleep command is bit or bits representing "I/O port write cycle". The data for checking first sleep data is a predetermined value "28h". The data for checking first sleep mask is another predetermined value "03Fh". The data for checking second sleep data is still another predetermined value "24h". The data for checking second sleep mask is also a predetermined value "03Fh". If the north bridge chip 11 realizes that the information of the second data write cycle is consistent with the above data set in the SMI service, e.g. the information of the data write cycle indicates an "enabled" state of a sleep command, a sleep address of "40FFh", a sleep command of "I/O port write cycle", a data write cycle of "24h" or "28h", a sleep mask of "03Fh", and an AND gate operation result of "24h" or "28h" between the written data and the sleep mask, the north bridge chip 11 will stop the transmission of the clock-suspending grant cycle STPGNT to the south bridge chip 12 until the power management of the PCI Express devices 140, 141, 142, 143 and 144 have been settled.

For switching the power states of the PCI Express devices 140, 141, 142, 143 and 144 to L2 or L3 sleep state before the power to these devices are removed, the north bridge chip 11 stops the transmission of the clock-suspending grant cycle STPGNT to the south bridge chip 12 while issuing a peripheral power-switching signal to each of the PCI Express devices 140, 141, 142, 143 and 144. After the north bridge chip 11 receives power-switching complete signals from all the PCI Express devices 140, 141, 142, 143 and 144 to confirm these PCI Express devices have already been switched to L2 or L3 sleep state, or after the peripheral power-switching signals have been issued for a predetermined time period, the data for reporting power management events will be switched into a power-switching complete state, e.g. bit "1", and then the transmission of the clock-suspending grant cycle STPGNT to the south bridge chip 12 is restored. Otherwise, the data for reporting power management events will be remained as bit "0" that indicates a power-switching incomplete state, and the clock-suspending grant cycle STPGNT to the south bridge chip 12 is still stopped. Under this circumstance, the power to the PCI Express devices 140, 141, 142, 143 and 144 can be removed without adversely affecting subsequent re-initialization of these devices.

In view of the foregoing, it is understood that power management is used in the present invention to take care of not only the power states of the system but also the power states of the PCI Express devices. Since the power removal of the PCI Express devices is performed under expectation, these devices can be successfully linked and initialized when being activated again.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power management method of a computer system, said computer system comprising a central processing unit (CPU), a host bridge, a secondary bridge and a peripheral device coupled to the host bridge, said method comprising steps of:

the CPU asserting a clock-suspending grant cycle to be transmitted to the secondary bridge via the host bridge when the CPU is in a ready state for a power-saving mode; and the host bridge performing a first power management operation before the computer system enters said power-saving mode.

2. The power management method according to claim 1 wherein said first power management operation comprises steps of:

issuing a peripheral power-switching signal to the peripheral device to switch a power state of the peripheral device while stopping the transmission of said clock-suspending grant cycle to the secondary bridge; and restoring the transmission of said clock-suspending grant cycle to the secondary bridge to perform a second power management operation after said power state of the peripheral device has been switched completely.

3. The power management method according to claim 2 wherein a power-switching complete signal is sent from the peripheral device back to the host bridge when said power state of the peripheral device has been switched completely.

4. The power management method according to claim 2 wherein said power state of the peripheral device is switched from a fully active link state to a lower power sleep state or a zero power sleep state in response to said peripheral power-switching signal.

5. The power management method according to claim 1 wherein said first power management operation comprises steps of:

issuing a peripheral power-switching signal to the peripheral device to switch a power state of the peripheral device while stopping the transmission of said clock-suspending grant cycle to the secondary bridge; and restoring the transmission of said clock-suspending grant cycle to the secondary bridge to perform a second power management operation when a predetermined time period has been due since said peripheral power-switching signal is issued.

6. The power management method according to claim 1 wherein said power-saving mode is selected from a group consisting of a standby mode, a STR mode, a software-shutoff mode and a mechanically shutoff mode.

7. The power management method according to claim 1 wherein the CPU asserts said clock-suspending grant cycle in response to a clock-suspending signal issued by the secondary bridge, and the secondary bridge issues said clock-suspending signal in response to a data write cycle asserted by the CPU.

8. The power management method according to claim 1 wherein the peripheral device is a Peripheral Component Interconnect (PCI) Express device.

9. A power management method of a computer system, said computer system comprising a central processing unit (CPU), a north bridge chip, a south bridge chip and a peripheral device coupled to the north bridge chip, said method comprising steps of:

the CPU asserting a data write cycle to the south bridge chip via the north bridge chip;

the north bridge chip performing a first power management operation of the peripheral device when information of said data write cycle is consistent with a specific condition; and the south bridge chip performing a second power management operation of the computer system after said first power management operation of the peripheral device.

10. The power management method according to claim 9 wherein the south bridge chip issues a clock-suspending signal in response to said data write cycle consistent with said specific condition, and the CPU asserts a clock-suspending grant cycle in response to said clock-suspending signal issued by the south bridge chip.

11. The power management method according to claim 10 wherein said first power management operation comprises steps of:

issuing a peripheral power-switching signal to the peripheral device to switch a power state of the peripheral device while stopping the transmission of said clock-suspending grant cycle to the south bridge chip; and restoring the transmission of said clock-suspending grant cycle to the south bridge chip after said power state of the peripheral device has been switched completely.

12. The power management method according to claim 11 wherein a power-switching complete signal is sent from the peripheral device back to the north bridge chip when said power state of the peripheral device has been switched completely.

13. The power management method according to claim 11 wherein said power state of the peripheral device is switched from a fully active link state to a lower power sleep state or a zero power sleep state in response to said peripheral power-switching signal.

14. The power management method according to claim 10 wherein said first power management operation comprises steps of:

issuing a peripheral power-switching signal to the peripheral device to switch a power state of the peripheral device while stopping the transmission of said clock-suspending grant cycle to the south bridge chip; and restoring the transmission of said clock-suspending grant cycle to the south bridge chip when a predetermined time period has been due since said peripheral power-switching signal is issued.

15. The power management method according to claim 9 wherein said second power management operation enables the computer system to enter said power-saving mode that is selected from a group consisting of a standby mode, a STR mode, a software-shutoff mode and a mechanically shutoff mode.

16. The power management method according to claim 9 wherein whether said information of said data write cycle is consistent with said specific condition is performed by comparing said information of said data write cycle with data stored in registers of the north bridge chip.

17. The power management method according to claim 16 wherein said information of said data write cycle to be compared includes the enable state of a sleep command, a sleep address, the type of a sleep command, a written data, a sleep mask, and an AND gate operation result of said written data and said sleep mask.

18. A power management method of a computer system, comprising steps of:

sending out a clock-suspending signal from a secondary bridge;

sending out a clock-suspending grant cycle from a CPU in response to said clock-suspending signal when the CPU is in a ready state for a power-saving mode;

performing a first power management operation by a host bridge; and transferring said clock-suspending grant cycle from the host bridge to the secondary bridge after said first power management operation is performed.

19. The power management method according to claim 18 further comprising a step of performing a second power management operation by the secondary bridge in response to said clock-suspending grant cycle.

20. The power management method according to claim 19 wherein said first power management operation is performed for entering a peripheral device coupled to the host bridge into a power-saving mode, and said second power management operation is performed for entering the system into a power-saving mode.

* * * * *